US012044060B1

(12) United States Patent
Flannery

(10) Patent No.: US 12,044,060 B1
(45) **Date of Patent: *Jul. 23, 2024**

(54) SMALL GATE WITHIN BIG GATE WITHIN BARRIER

(71) Applicant: Carlson Pet Products, Inc., Burnsville, MN (US)

(72) Inventor: Mark A. Flannery, Longboat Key, FL (US)

(73) Assignee: Carlson Pet Products, Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,284

(22) Filed: Sep. 10, 2023

Related U.S. Application Data

(63) Continuation of application No. 17/080,736, filed on Oct. 26, 2020, now Pat. No. 11,753,867, which is a continuation of application No. 16/410,944, filed on May 13, 2019, now abandoned, which is a continuation of application No. 15/275,465, filed on Sep. 25, 2016, now Pat. No. 10,287,819, which is a continuation of application No. 13/902,838, filed on May 26, 2013, now Pat. No. 9,458,668, which is a continuation of application No. 11/337,749, filed on Jan. 22, 2006, now Pat. No. 8,448,381.

(Continued)

(51) Int. Cl.

| | |
|---|---|
| ***E06B 11/02*** | (2006.01) |
| ***E06B 3/36*** | (2006.01) |
| ***E06B 7/32*** | (2006.01) |
| ***E06B 9/04*** | (2006.01) |
| *E06B 9/00* | (2006.01) |

(52) U.S. Cl.
CPC .............. *E06B 11/022* (2013.01); *E06B 3/36* (2013.01); *E06B 7/32* (2013.01); *E06B 9/04* (2013.01); *E06B 2009/002* (2013.01)

(58) Field of Classification Search
CPC .... E06B 2009/002; E06B 11/022; E06B 7/32; Y10T 292/102; Y10S 92/29; E05B 3/36
See application file for complete search history.

(56) References Cited

U.S. PATENT DOCUMENTS

| | | | |
|---|---|---|---|
| 270,309 | A | 1/1883 | Harrison |
| 1,189,410 | A | 7/1916 | Van Every |

(Continued)

FOREIGN PATENT DOCUMENTS

| | | |
|---|---|---|
| GB | 671856 | 5/1952 |
| GB | 787142 A | 12/1957 |

(Continued)

OTHER PUBLICATIONS

Gate. Dictionary.com. The American Heritage Dictionary of Idioms by Christine Ammer. Houghton Mifflin Company. http://dictionary.reference.com/browse/gate (accessed: Mar. 13, 2009).

*Primary Examiner* — Gregory J Strimbu

(57) ABSTRACT

A first gate is disposed within a second gate of a barrier for extending across a passageway of a residence. The second gate can be closed to, for example, minimize access of toddlers to the passageway, while the first gate can be opened to, for example, maximize access of small dogs to the passageway. The barrier includes a locking mechanism between the second gate and a frame of the barrier.

1 Claim, 2 Drawing Sheets

Related U.S. Application Data

(60) Provisional application No. 60/722,347, filed on Oct. 1, 2005.

(56) References Cited

U.S. PATENT DOCUMENTS

| | | | |
|---|---|---|---|
| 1,242,757 | A | 10/1917 | Anway |
| 1,511,455 | A | 10/1924 | Freyberg et al. |
| 1,542,151 | A | 6/1925 | Lehtonen |
| 2,275,914 | A | 3/1942 | Lorenz |
| 2,651,814 | A | 9/1953 | Lester |
| 2,851,746 | A | 9/1958 | McPhaden |
| 3,589,576 | A | 6/1971 | Rinkle |
| 3,906,671 | A | 9/1975 | Maldonado |
| 4,334,573 | A | 6/1982 | Hackman |
| 4,583,715 | A | 4/1986 | Wright |
| 4,607,455 | A | 8/1986 | Bluem et al. |
| 4,611,431 | A | 9/1986 | Lauro |
| 4,628,635 | A | 12/1986 | Maillard |
| 4,677,791 | A | 7/1987 | Larson et al. |
| 4,685,247 | A | 8/1987 | Alam |
| 4,702,036 | A | 10/1987 | Johnson |
| 4,713,922 | A | 12/1987 | Ingold |
| 5,060,421 | A | 10/1991 | Castelli |
| 5,117,585 | A | 6/1992 | Andrisin, III |
| 5,272,840 | A | 12/1993 | Knoedler |
| 5,535,550 | A | 7/1996 | Yang |
| 5,544,870 | A | 8/1996 | Kelley et al. |
| 5,797,218 | A | 8/1998 | Holland |
| 5,809,694 | A | 9/1998 | Postans |
| 6,018,916 | A | 2/2000 | Henry |
| 6,027,104 | A | 2/2000 | Alexander et al. |
| D422,367 | S | 4/2000 | Mishina |
| 6,056,038 | A | 5/2000 | Foster et al. |
| 6,161,334 | A | 12/2000 | Goodin |
| 6,176,042 | B1 | 1/2001 | Rossman et al. |
| 6,233,874 | B1 | 5/2001 | Johnson, Jr. |
| 6,253,490 | B1 | 7/2001 | Postans |
| 6,301,832 | B1 | 10/2001 | Andersen |
| 6,446,395 | B2 | 9/2002 | Rogers |
| 6,499,254 | B2 | 12/2002 | Rossman et al. |
| 6,655,087 | B2 | 12/2003 | Andersen |
| 6,681,523 | B1 | 1/2004 | Stener |
| 6,681,720 | B1 | 1/2004 | Skurdalsvold et al. |
| 6,877,721 | B2 | 4/2005 | Calverley |
| 6,990,926 | B2 | 1/2006 | Gao |
| 7,152,372 | B2 | 12/2006 | Cheng |
| 7,293,530 | B2 | 11/2007 | Italiano |
| 7,334,624 | B2 | 2/2008 | Waldman et al. |
| 7,373,755 | B2 | 5/2008 | Jefferys et al. |
| D577,465 | S | 9/2008 | Eren |
| 7,540,046 | B1 | 6/2009 | Lai |
| 7,950,184 | B2 | 5/2011 | Flannery |
| 7,963,575 | B2 | 6/2011 | Mayo |
| 7,975,431 | B2 | 7/2011 | Flannery |
| 8,141,517 | B2 | 3/2012 | Shimoda et al. |
| 8,196,348 | B2 | 6/2012 | Flannery |
| 8,448,381 | B2 | 5/2013 | Flannery |
| 8,745,922 | B1 | 6/2014 | Matsuda |
| D708,354 | S | 7/2014 | Weisbeck et al. |
| 8,806,812 | B2 | 8/2014 | Kolovich |
| D714,960 | S | 10/2014 | Weisbeck |
| 9,382,750 | B1 | 7/2016 | Flannery |
| 9,458,668 | B1 | 10/2016 | Flannery |
| 11,377,886 | B1 * | 7/2022 | Flannery ................. E05B 1/003 |
| 11,753,867 | B1 * | 9/2023 | Flannery ................... E06B 9/04 49/169 |
| 2001/0000556 | A1 | 5/2001 | Rossman et al. |
| 2001/0017471 | A1 | 8/2001 | Cheng |
| 2002/0079708 | A1 | 6/2002 | Welsh |
| 2002/0157316 | A1 | 10/2002 | Andersen |
| 2003/0009945 | A1 | 1/2003 | Cheng |
| 2003/0110704 | A1 | 6/2003 | Cheng |
| 2003/0197164 | A1 | 10/2003 | Monahan |
| 2004/0045222 | A1 | 3/2004 | Hicks |
| 2005/0028947 | A1 | 2/2005 | Waldman et al. |
| 2006/0169217 | A1 | 8/2006 | Glassford |
| 2006/0207180 | A1 | 9/2006 | Cheng |
| 2006/0260195 | A1 | 11/2006 | Witman |
| 2007/0017156 | A1 | 1/2007 | Robinson et al. |
| 2007/0074453 | A1 | 4/2007 | Flannery |
| 2007/0227462 | A1 | 10/2007 | Huff |
| 2009/0178624 | A1 | 7/2009 | Hirokawa |
| 2009/0293363 | A1 | 12/2009 | Flannery |
| 2012/0055092 | A1 | 3/2012 | Boucquey |
| 2014/0061563 | A1 | 3/2014 | Weisbeck et al. |
| 2015/0101250 | A1 | 4/2015 | Marsden |

FOREIGN PATENT DOCUMENTS

| | | | |
|---|---|---|---|
| GB | 1571070 | | 4/1980 |
| GB | 2193992 | A | 2/1988 |
| GB | 2234281 | A | 1/1991 |
| GB | 2310447 | | 8/1997 |
| WO | 02/099238 | A1 | 12/2002 |
| WO | 03/052231 | A1 | 6/2003 |

* cited by examiner

SMALL GATE WITHIN BIG GATE WITHIN BARRIER

This application is a continuation of U.S. patent application Ser. No. 17/080,736 filed Oct. 26, 2020 (U.S. Pat. No. 11,753,867 issued Sep. 12, 2023) and claims the benefit thereof under 35 U.S.C. § 120, which application was a continuation of U.S. patent application Ser. No. 16/410,944 filed May 13, 2019 (abandoned) and claims the benefit thereof under 35 U.S.C. § 120, which application was a continuation of U.S. patent application Ser. No. 15/275,465 filed Sep. 25, 2016 (U.S. Pat. No. 10,287,819 issued May 14, 2019) and claims the benefit thereof under 35 U.S.C. § 120, which application was a continuation of U.S. patent application Ser. No. 13/902,838 filed May 26, 2013 (U.S. Pat. No. 9,458,668 issued Oct. 4, 2016) and claims the benefit thereof under 35 U.S.C. § 120, which was a continuation of U.S. patent application Ser. No. 11/337,749 filed Jan. 22, 2006 (U.S. Pat. No. 8,448,381 issued May 28, 2013) and claimed the benefit thereof under 35 U.S.C. § 120, which claimed the benefit under 35 U.S.C. 119(e) of U.S. Provisional Patent Application No. 60/722,347 filed Oct. 1, 2005, all of which applications are hereby incorporated by reference in their entireties into this application.

FIELD OF THE INVENTION

The present invention generally relates to a barrier in a residential home, particularly to such a barrier having a gate, and specifically to such a barrier having a first gate that in turn has a second gate.

BACKGROUND OF THE INVENTION

Homes are dangerous places for children. Children fall down stairs, stick forks into electrical sockets, climb onto countertops, put metal objects into microwaves, turn on gas stoves, operate electric hair dryers on wet floors, hide in freezers and front load washers and dryers, open medicine cabinets, and pester old dogs. New parents soon become safety conscious.

A staircase is especially dangerous. The staircase itself is enticing. It offers a place to slide down. Or, if an open staircase, it is a cliff off which to hang and drop. What is beyond the staircase is further fun. The staircase may lead to a dark basement. Or it may run to a strangely lit attic.

Some rooms can temporarily or permanently be off-limits to children. One such room is the kitchen. For example, the cook may not wish to watch where he or she is walking while carrying a hot dish in glass bakeware from the stove to a counter top.

To minimize some of the above problems, a child safety gate may help to keep a child out of a certain area. The child safety gate may be positioned at the top of a staircase or at the bottom of a staircase. The child safety gate may be positioned between the living room and the kitchen while dinner is prepared. Or the child safety gate may be positioned at some other location in the home.

One problem with the child safety gate is its very nature: it is a barrier. For example, even an adult has difficulty stepping high over the child safety gate, an activity that in itself can inflict serious bodily harm. To minimize such high stepping, many child safety gates have an easy open—but child proof—gate so that the older child or adult is minimally burdened by the barrier.

Moreover, those who cannot speak of their problems often suffer great inconveniences from a child safety gate. For example, small dogs cannot jump over or squeeze through the child safety gate like a cat. The small dog, therefore, must suffer from 1) lack of attention from a small child because the small dog cannot—because of the child safety gate—gain access to the child or 2) too much attention from a small child because the small dog cannot—because of the child safety gate—get away from the child.

SUMMARY OF THE INVENTION

A feature of the present invention is the provision in a removable barrier in a residential home having a relatively large gate, of a relatively small gate within the relatively large gate.

Another feature of the present invention is the provision in such a removable barrier, of the size of the relatively small gate being sufficiently great to permit the passage of a relatively small dog, and of the size of the relatively small gate being sufficiently small to prevent a toddler from climbing through the relatively small gate. Preferably, the relatively small gate measures about ten inches in height (from top to bottom) and about seven inches in width (from side to side).

Another feature of the present invention is the provision in such a removable barrier, of the relatively large gate swinging on an axis that is offset from the axis on which the relatively small gate swings.

Another feature of the present invention is the provision in such a removable barrier, of the relatively large gate swinging on an axis that is generally parallel to the axis on which the relatively small gate swings.

Another feature of the present invention is the provision in such a removable barrier, of each of the relatively large and small gates having lowermost portions, and of the lowermost portions confronting each other and being swingable relative to each other.

Another feature of the present invention is the provision in such a removable barrier, of the relatively large gate being swingable in one of a forward and rearward direction, and of the small gate being swingable in each of the forward and rearward directions.

An advantage of the present invention is that a small dog may be permitted to pass through the present residential home passageway barrier and, at the same time, a toddler is not permitted to pass through the child safety gate.

Another advantage of the present invention is that the present residential home passageway barrier is inexpensive to manufacture.

Another advantage of the present invention is that the present residential home passageway barrier is simple to set up in a passageway of a residential home.

Another advantage of the present invention is that the present residential home passageway barrier is simple to operate.

Another advantage of the present invention is that the present residential home passageway barrier is simple to take down from a passageway in a residential home.

Another advantage of the present invention is that the present residential home passageway barrier is see-through. The frame of the residential home passageway barrier is see through. The relatively large gate is see through. The relatively small gate is see through. The caretakers and children can see each other when on opposing sides of the barrier.

Another advantage of the present invention is that the present residential home passageway barrier is removable from the passageway of the residential home and portable such that the barrier can be set up at another location.

DESCRIPTION

Figure 1B:
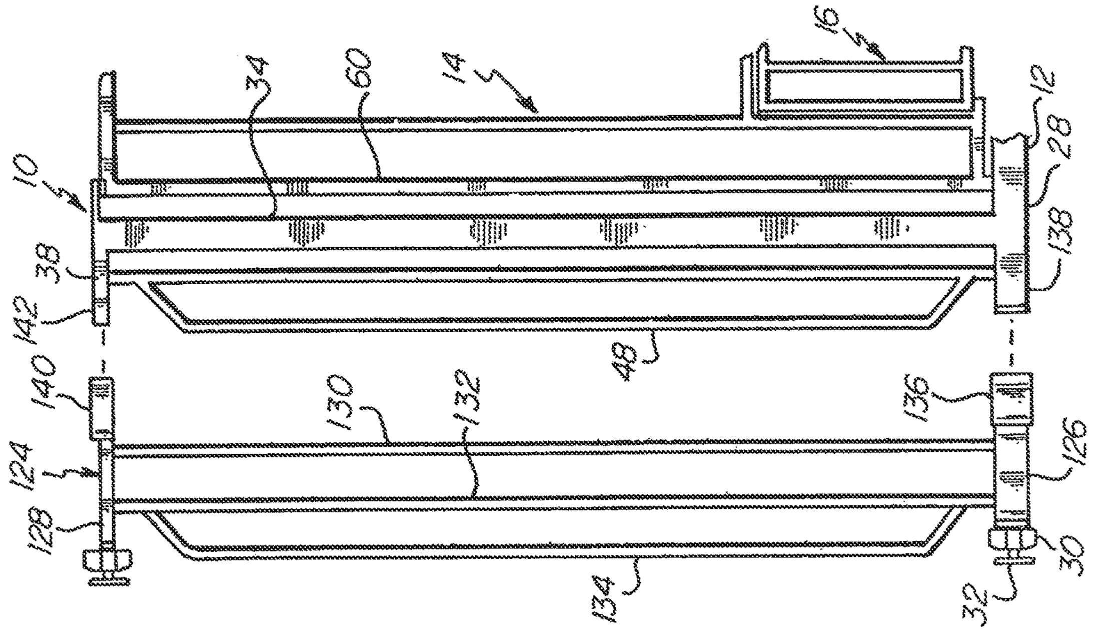
FIG. 1B shows a front partial view of the residential passageway barrier of FIG. 1A and further shows a front full view of an extension for the residential passageway barrier of FIG. 1A.
Figure 1A:
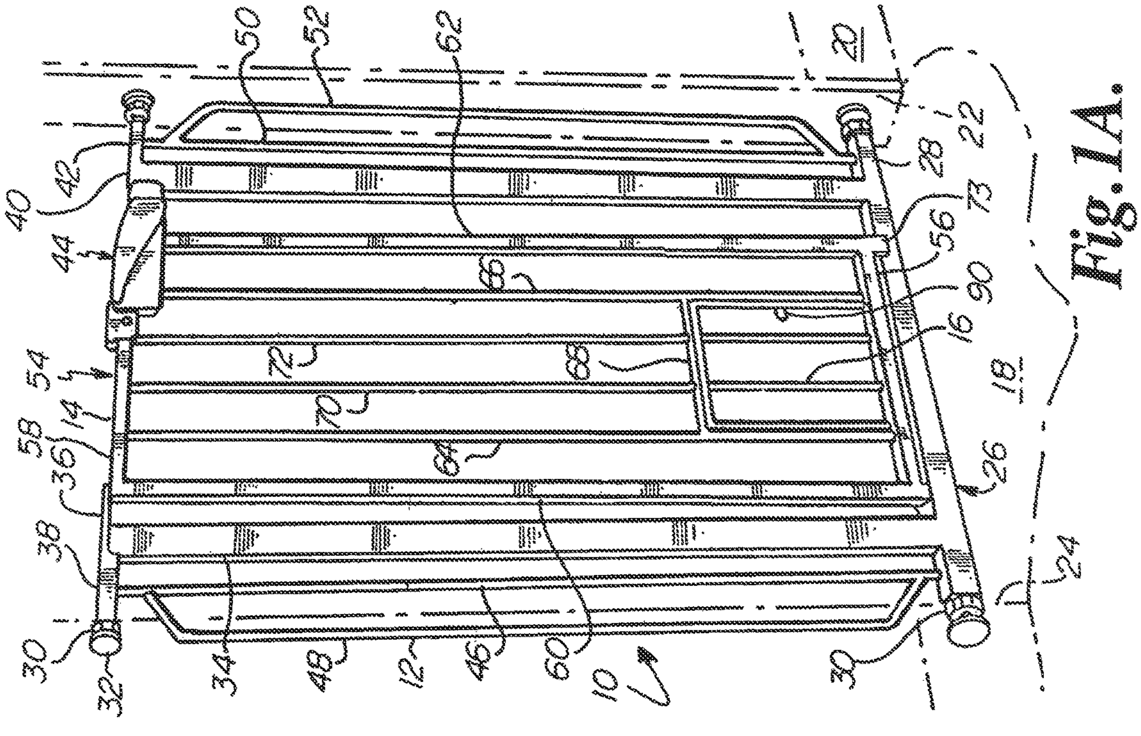
FIG. 1A is a perspective view of the present residential passageway barrier set up in a passageway of a residential home, where the passageway is shown in phantom.

As shown in FIG. 1A, the present residential home passageway barrier or child safety gate is indicated by reference numeral 10. Barrier 10 generally includes a frame 12, which includes a relatively large gate 14, which includes a relatively small gate 16. Barrier 10 can be set up in a passageway 18 of a residential home 20. The passageway 18 includes opposing sides 22, 24. Passageway 18 can be a hallway or an entrance into a room or the space at the top of a staircase or the space at the bottom of a staircase or another type of passageway.

More specifically, frame 12 includes a generally U-shaped main frame portion 26. Main frame portion 26 includes a lowermost tubular horizontally extending frame member 28 that runs from one side 22 of passageway 18 to the other side 24 of passageway 18. At each of the ends of the lowermost frame member 28, a threaded connection 30 is engaged. Threaded connection 30 can be screwed into or out of its respective end of lowermost frame section 28 to effectively lengthen or shorten the length of lowermost frame member 28 such that lowermost frame member 28 can be rigidly and removably engaged between opposing sides 22 and 24 of passageway 18. Threaded connection 30 includes an elastomeric or plastic or resilient head 32 that engages without marking up the surfaces of sides 22 and 24.

U-shaped main frame portion 26 further includes an upright support member 34. Upright support member 34 is generally T-shaped so as to include an inwardly extending frame member 36 and an outwardly extending frame member 38. Outwardly extending frame member 38 includes threaded connection 30 having head 32.

U-shaped main frame portion 26 further includes upright support member 40. Upright support member 40 is formed in the shape of an inverted L so as to include an outwardly extending frame member 42 that includes threaded connection 30 with head 32. Outwardly extending frame member 42 is coaxial with outwardly extending frame member 38. It should be noted that, when fabricated, U-shaped main frame portion 26 is formed such that upright support members 34 and 40 are slightly oblique relative to one another and are not parallel to one another, such that upright support member 40 lies at an obtuse (greater than ninety degrees) angle relative to lowermost frame member 28, and such that pressure must be applied to upright support member 40 to draw upright support member 40 into a right angle relationship with lowermost frame member 28. Such pressure is the screwing outwardly of threaded connections 30 of one or more of support members 38 and 42. Such pressure and such a drawing in of upright support member 40 provides resiliency and rigidity to frame 12 as a whole. Such pressure and such a drawing in of upright support member 40 drawings the upper portion of upright support member to a locking relationship with locking mechanism 44.

Lowermost frame member 28 and upright support members 34 and 40 are preferably one-piece. Each of lowermost frame member 28, upright support member 34, and upright support member 40 are rectangular in section and are tubular.

Frame 12 further includes an upright support member 46 rigidly engaged, such as by welding, between outwardly extending support member 38 and lowermost support member 28. Frame 12 further includes a generally U-shaped support member 48 rigidly engaged at its ends, such as by welding, to upright support member 46. Support member 48 confronts side 24 of passageway 18.

Frame 12 further includes an upright support member 50 rigidly engaged, such as by welding, between outwardly extending support member 42 and lowermost support member 28. Frame 12 further includes a generally U-shaped support member 52 rigidly engaged at its ends, such as by welding, to upright support member 50. Support member 52 confronts side 22 of passageway 18.

Relatively large gate 14 is swingably engaged via pin connectors between inwardly extending support member 36 and lowermost support member 28. Relatively large gate 14 includes a main or exterior rectangular frame portion 54 that includes a lowermost horizontally extending support member 56, an uppermost horizontally extending support member 58, an end upright support member 60 that defines the axis on which relatively large gate 14 swings, and an end upright support member 62. Each of the support members 56, 58, 60 and 62 are tubular and rectangular in section. Relatively large gate 14 further includes, within the rectangular frame portion 54, an upright support member 64 extending to and between lowermost support member 56 and uppermost support member 58, upright support member 66 extending to and between the lowermost support member 56 and uppermost support member 58, and a horizontally extending support member 68 extending between the upright support members 64 and 66. Relatively large gate 14 further includes upright support members 70 and 72, where each of the upright support members 70 and 72 extends to and between horizontally extending support member 68 and uppermost support member 58. Relatively large gate 14 further includes a rigid tab 73 or downward extension 73 of upright support member 62 that confronts a side surface of horizontally extending support member 28. With rigid tab 73, relatively large gate 14 is a one-way swingable gate that swings in only one of a forward or rearward direction, depending upon the orientation of the barrier 10 as a whole and the particular passageway 18 in which the barrier 10 is set up and is barred, via rigid tab 73, from swinging in the other direction.

Figure 2A:
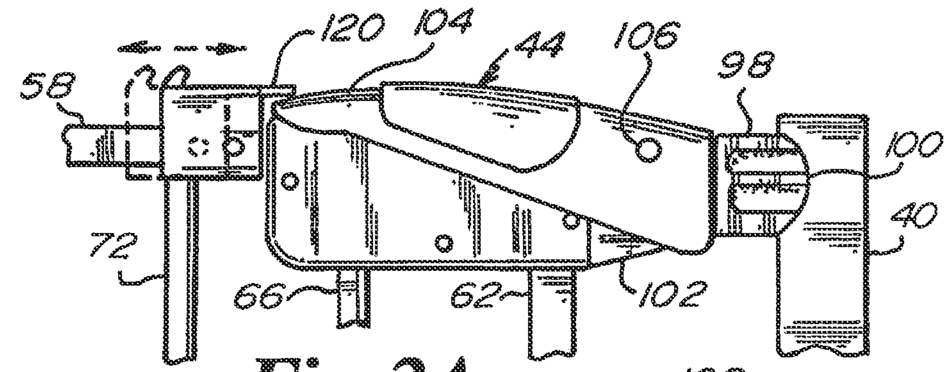
FIG. 2A is a front detail view of the lock mechanism of the residential passageway barrier of FIG. 1A, where the lock mechanism is in a closed position.
Figure 2B:
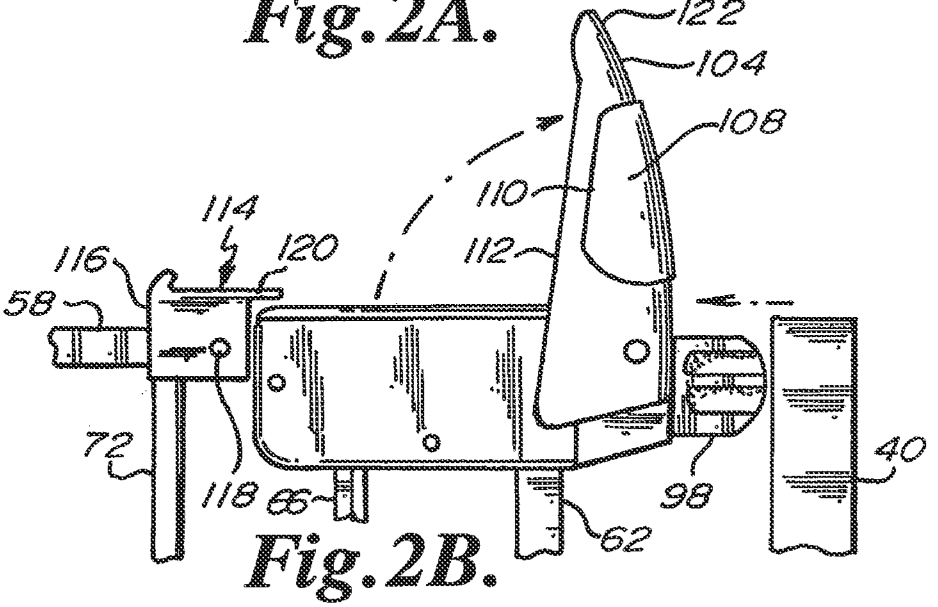
FIG. 2B is a front detail view of the lock mechanism of the residential passageway barrier of FIG. 1A, where the lock mechanism is in an open position.
Figure 2C:
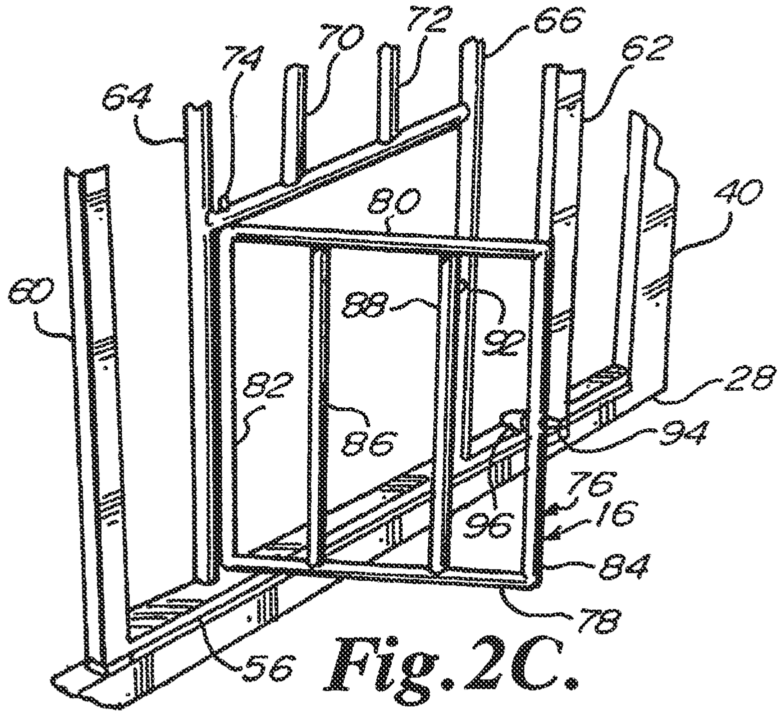
FIG. 2C is a perspective detail view of the relatively small gate of the residential passageway barrier of FIG. 1A and shows the relatively small gate in an open position.

As shown in FIG. 2C, relatively small gate 16 is swingably engaged via pin connectors 74 between horizontally extending support member 68 and lowermost support member 56. Relatively large gate 16 includes a main or exterior rectangular frame portion 76 that includes a lowermost horizontally extending support member 78, an uppermost horizontally extending support member 80, an end upright support member 82 that defines the axis on which relatively large gate 16 swings, and an end upright support member 84. Relatively small gate 16 further includes upright support members 86 and 88 extending to and between lowermost support member 78 and uppermost support member 80. Upright support member 86 is coaxial with upright support member 70 when the relatively small gate 16 is closed. Upright support member 88 is coaxial with upright support member 72 when the relatively small gate 16 is closed. Relatively small gate 16 further includes a coil spring loaded pin connector 90, mounted in upright support member 84, that can engage an opening 92 in upright support member 66 via a distal end 94. Pin connector 90 further includes a roughened cap 96 that acts as a handle that fingers can manipulate to draw the biased pin connector end 94 out of the opening 92. When cap 96 is released, pin connector end 94 is biased via the internal coil spring such that pin connector end 94 automatically is pushed away from upright support member 84 and into opening 92 if the relatively small gate 16 is aligned with or coplanar with relatively large gate 14.

It should be noted that lowermost support member 56 of the relatively large gate 14 is slightly spaced, such as via a nylon or plastic washer, from lowermost support member 28 of main frame 26 such that the relatively large gate 14 is swingable. It should be noted that each of the support members 78, 80, 82 and 84 of the relatively small gate 16 is slightly spaced from its respective support members 56, 68, 64 and 66 of the relatively large gate 14 such that the relatively small gate 16 is swingable within the relatively large gate 14.

As shown in FIG. 1A, the large gate 14 includes a large gate frame that is one-piece such that the lowermost frame member or lower horizontally extending support member 56, the proximal end frame member 60, the distal end frame member 62, the upper horizontally extending support member 58, upright support members 64, 66, 70, 72, and the third horizontally extending support member 68 are a one-piece unitary and integral element that is non-rotatably fixed to the large gate 14.

As still further shown in FIG. 1A, the small gate 16 when closed is adjacent to the lower and the third horizontally extending support members 56 and 68, is further adjacent to the upright support members 64 and 66, and is further adjacent to the lower end of one of the third upright support members 70 or 72.

Each of the barrier frame 26, large gate 14, and small gate 16 includes a lowermost horizontally extending frame member 28, 56, and 78, respectively, with the lowermost horizontally extending frame member 28 of the barrier frame 26 being adjacent to the lowermost horizontally extending frame member 56 of the large gate 14 and with no horizontally extending frame members being disposed therebetween, and with the lowermost horizontally extending frame member 56 of the large gate 14 being adjacent to the lowermost horizontally extending frame member 78 of the small gate 16 and with no horizontally extending frame members being disposed therebetween.

The large gate 14 includes a first gate frame that includes an endless and unbroken framing perimeter immediately about the second gate perimeter. The framing perimeter includes a) a portion of upright support member 64, b) the horizontally extending support member 68, c) a portion of upright support member 66, and d) a portion of horizontally extending support member 56. The second gate perimeter of the second gate 16 includes the perimeter of support members 78, 80, 82 and 84. The horizontally extending support member 68 is immediately adjacent to a top of the second gate perimeter of the second gate 16.

The lowermost horizontally extending frame member 28 of the barrier frame 12 is adjacent to the lowermost horizontally extending frame member 56 of the first gate 14 with no horizontally extending frame members being disposed therebetween when the first gate 14 is in a closed position.

As shown in FIGS. 2A and 2B, locking mechanism 44 includes a sliding foot 98 having a U-shaped distal end 100 for engaging upright support member 40, which is rectangular in section, where the U-shape wraps about the upright front and back sides of the upright support member 40. Foot 98 is engaged in and slides into and out of a body 102 of locking mechanism 44. Body 102 is fixed, via pin connectors, to the relatively large gate 14 about support members 58, 62, and 66. U-shaped distal end 100 is drawn away from and pushed back about upright support member 40 via a pivot arm 104 that is swingably fixed to body 102 via a pivot pin 106. Pivot arm 104 includes a fixed raised portion 108 having a border 110 or edge 110 such that edge 110 and an edge 112 of pivot arm 104 are generally horizontally extending edges that aid a hand getting a grip to lift pivot arm 104 generally vertically to slide distal end 100 onto and off of upright support member 40. Locking mechanism 44 further includes a lock 114. Lock 114 includes a body 116 that is slidingly fixed on uppermost support member 58 via a pin 118 engaging a slot in uppermost support member 58. Body 116 is internally spring loaded, such as via a coil spring, such that body 116 is biased to a normally closed and locked position where a rigid tab 120 or rigid extension 120 of body 116 confronts an end 122 of pivot arm 104, as shown in FIG. 2A. Body 116 is slideable from the normally closed and locked position to an open position, as shown in FIG. 2B, such that tab 120 is slid away from pivot arm end 122 such that pivot arm 104 can be pivoted up, an action that draws foot 98 into pivot arm body 102, via an internal rider and track arrangement between the pivot arm 104 and the foot 98.

As shown in FIG. 1B, barrier 10 may include a barrier extension 124. Barrier extension 124 includes a lowermost support member 126 and an uppermost support member 128. Barrier extension 124 further includes a pair of upright support members 130 and 132 engaged to and between the lowermost support member 126 and uppermost support member 128. Barrier extension 124 further includes a generally U-shaped support member 134 rigidly engaged at its ends, such as by welding, to upright support member 132. Support member 134, when barrier extension 124 is engaged to barrier 10, confronts one of the sides 22, 24 of passageway 18. Lowermost support member 126 includes a U-shaped connection 136 that engages, such as by a frictional engagement, an end 138 of lowermost support member 28 of frame 12. Uppermost support member 128 includes a U-shaped connection 140 that engages, such as by a frictional engagement, an end 142 of outwardly extending frame member 38. The friction fit between U-shaped connections 136 and 140 and respective ends 138 and 142 can be supplemented by an internal pin and hole arrangement, where the pins and holes extend horizontally and where the pin is fixed to one of frame 12 and barrier extension 124 and where the hole is formed in the other of the frame 12 and barrier extension 124.

Threaded connection 30 is a removable connection that is screwable off frame 12, such as off ends 138 and 142. FIG. 1A shows the threaded connection 30 on each of the ends of lowermost support member 28 and on each of the outwardly extending frame sections 38 and 42. FIG. 1B shows the threaded connection 30 off of ends 138, 142 and screwed onto the outer ends of support members 126 and 128. It should be noted that barrier extension 124 is engagable to either end of frame 12 such that barrier extension 124 can confront either support member 48 or support member 52, that barrier extensions 124 can be utilized on both ends of the frame 12, and that one barrier extension 124 can engage another barrier extension 124 that can engage still another barrier extension 124 and so on.

In operation, to install the barrier 10, the width of the passageway 18 is measured so as to ascertain whether frame 12 will be used by itself or whether a barrier extension 124 will be required. If required, then one or more barrier extensions 124 are engaged. Then the threaded connections 30 having the heads 32 are screwed into the four corners of the barrier 10. Then the barrier 10 is set between the sides 22 and 24 of the passageway 18 and then the threaded connections 30 are screwed outwardly so as to engage the sides 22 and 24. When barrier 10 is in place, lowermost support member 28 may lie on the floor or be slightly spaced off the floor. As the threaded connections 30 are screwed out, upright support member 40 is drawn into engagement with the U-shaped distal end 100 of the lock mechanism 44 such that barrier 10 is placed under pressure and such that barrier 10 is secure in its location in the passageway 18.

In operation, to open the relatively large gate 14, the sliding lock 114 is operated to take tab 120 out of a confronting relationship with pivot arm end 122. Then the pivot arm 104 is lifted to slide in foot 98 and draw U-shaped distal end 100 out of an engaged position with upright support member 40. Then the relatively large gate 14 is swung open on an axis defined by upright support member 60. Then the user can walk through the resultant opening of the barrier 10. Once through, the user swings the relatively large gate 14 shut, slides open the lock 114, lays down the pivot arm 104 fully onto the pivot arm body 102, and releases the lock 114, thus permitting the tab 120 to confront and lay over pivot arm end 122.

In operation, to open the relatively large gate 14 without repeatedly using lock 114, lock 114 is slid away from pivot arm end 122, which is then lifted up slightly, whereupon lock 114 is released to permit tab 120 to slide under pivot arm end 122 such that pivot arm end 122 lies on top of tab 120. Then, when a user approaches barrier 10, the user merely lifts up pivot arm 104 to open the gate 14, and then merely pushes pivot arm 104 back down to close gate 14 such that the user need not slide lock 114 back and forth. This arrangement may be used, for example, when children are not yet sufficiently tall to reach the pivot arm 104.

In operation, to open the relatively small gate 16, the cap or handle end 96 is drawn out so as to bring the distal pin end 94 out of opening 92, whereupon the relatively small gate 16 can be swung open about an axis defined by upright support member 82. Relatively small gate 16 can open to and away from either face of the barrier 10 such that the small gate 16 can open forwardly or rearwardly. When the relatively small gate 16 is open and the connector pin 90 is released, the connector pin 90 is biased such that distal pin end 94 juts out from upright support member 84 and such that distal pin end 94 abuts and make contacts with upright support member 66 as the relatively small gate 16 is swung back to the relatively large gate 14. Thus, relatively small gate 16 can remain open if desired for a small dog to push open with his or her nose or draw back with his or her paw. To close relatively small gate 16, pin 90 is drawn in until the distal end 94 can move past upright support member 66 and into the opening 92 of upright support member 66.

In operation, when the relatively small gate 16 is open, the opening left by the small gate 16 is sufficiently large such that a small dog can walk through and is sufficiently small such that a toddler cannot crawl through.

In operation, to uninstall the barrier 10, one or more threaded connections 30 are screwed into the frame 12 so as to release pressure in frame 12, and then threaded connections 30 are screwed in (such as one pair of threaded connections engaging side 22) to fully release the barrier 10 from the passageway 18. The barrier 10 can then be carried away and set up at another location or stored.

Relatively large gate 14 swings on an axis defined by upright support member 60. Relatively small gate 16 swings on an axis defined by upright support member 82. Such axis and upright support members 60 and 82 are parallel to and offset from each other.

U-shaped main frame portion 26 includes a first rigid portion, such as upright support member 34, and a second rigid portion, such as upright support member 40. The relatively large gate 14 is swingably engaged to one such rigid portion and lockable to the other such rigid portion.

Relatively large gate 14 has lowermost support member 56 that confronts and swings relative to lowermost support member 78 of the relatively small gate 16.

Relatively large gate 14 is in a plane defined by frame 12 when gate 14 is closed. Relatively small gate 16 is in a plane defined by relatively large gate 14 when small gate 16 is closed such that the frame, large gate 14 and small gate 16 are coplanar when the gates 14 and 16 are closed.

Tab 73 can be on either of the large gate 14 or on frame portions of the support members confronting upright support member 62, such as support member 28 such that one of the gate 14 or frame portion can block the other of the gate 14 or frame portion such that gate 14 is a one-way swingable gate.

Relatively small gate 16 can be swung either way through the plane defined by relatively large gate 16.

It should be noted that relatively large gate 14 and relatively small gate 16 are independent of the other. Operation of one gate is not dependent upon operation of the other gate.

The relatively large gate 14 includes a proximal end frame member, such as upright support member 60, and a distal end frame member, such as upright support member 62. The relatively small gate 16 includes a proximal end frame member, such as upright support member 82, and a distal end frame member, such as upright support member 84. Such proximal end frame members are spaced from each other. Such distal end frame members are spaced from each other.

Relatively large gate 14 includes a plurality of upright support members. Relatively small gate 16 includes a plurality of upright support members. The upright support members 86 and 88 of the relatively small gate 16 are coaxial with respective support members 70 and 72 of the relatively large gate 14.

One rigid portion of frame 12 includes upright support members 30, 46 and 48 and runs on one side of the relatively large gate 14. Another rigid portion of frame 12 includes upright support members 40, 50 and 52 and runs on the other side of the relatively large gate 14.

The height of barrier 10 (and the height of relatively large gate 14) is preferably between about two feet and about five feet, more preferably between about two and one-half feet and about three and one-half feet, and most preferably between about three feet and about four feet.

The height (from top to bottom) of an opening left by the open small gate 16 is preferably between about eight and twelve inches, more preferably between about nine and eleven inches, and most preferably about ten inches. The width (from side to side) of an opening left by the open small gate 16 is preferably between about five and nine inches, more preferably between about six and eight inches, and most preferably about seven inches.

According to the American Heritage® Dictionary of the English Language, Fourth Edition, Copyright© 2000, a gate is a structure that can be swung, drawn, or lowered to block an entrance or a passageway.

An example of a gate that can be drawn is a scissors like gate that is drawn shut or opened up accordion style. Another example of a gate that can be drawn shut or drawn open is a sliding gate.

An example of a gate that can be lowered or raised is a sliding gate. Another example of a gate that can be lowered is a scissors like gate that is lowered or raised accordion style. Still another example of a gate that can be lowered or raised is a gate swinging on a horizontal axis.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A residential passageway barrier for a residential passageway having opposing sides, with the residential passageway barrier comprising:

a) a frame having a sufficient length to extend across the residential passageway to each of the opposing sides, with the frame adaptable to be engaged to each of the opposing sides such that the residential passageway barrier is removable from the opposing sides of the residential passageway;

b) the frame including a first rigid portion that is fixed relative to one of the opposing sides of the residential passageway and a second rigid portion that is fixed relative to the other of the opposing sides;

c) a gate swingably engaged to the first rigid portion of the frame and lockable to the second rigid portion of the frame;

d) the frame being generally in a plane, with the gate being generally in said plane when the gate is in a closed position; and e) a lock on the gate, the lock engaging the second rigid portion of the frame when locking the gate in the closed position;

f) the lock having a first body, the first body having a first body end portion and a second body end portion;

g) the lock having a foot engaged to and slideable to and away from the first body, the foot being adjacent to the first body end portion of the first body and spaced from the second body end portion of the first body, the foot being slideable to a first position where the foot engages the second rigid portion of the frame to prevent the gate from swinging relative to the frame when the gate is in the closed position, the foot being slideable to a second position where the foot has been drawn toward the first body and away from the second rigid portion of the frame to permit the gate to swing relative to the frame;

h) the lock having a pivot arm, the pivot arm swingably engaged to the first body and further engaged to the foot, the pivot arm when swung in a first direction drawing the foot toward the second position, the pivot arm when swung in a second direction pushing the foot toward the first position;

i) the lock having a second body, the second body having a closed position where the second body engages and locks the pivot arm relative to the gate to prevent the pivot arm from swinging relative to the gate, the second body having an open position where the second body permits the pivot arm to swing relative to the gate, the second body sliding between the closed position and the open position, the second body being adjacent to the first body when the second body is in the closed position;

j) such that the gate is swingable from the closed position when the pivot arm has been swung in the first direction and the foot is in the second position;

k) such that the gate is locked to the frame when the gate is in the closed position, the pivot arm has been swung in the second direction, the foot is in the first position, and the second body is in the closed position where the second body engages and locks the pivot arm;

l) the pivot arm including a first position when the foot engages the second rigid portion of the frame and a second position when the foot is disengaged from the second rigid portion of the frame, the pivot arm when in the first position being adjacent to the first and second body end portions of the first body, and the pivot arm when in the second position being adjacent to the first body end portion of the first body and being spaced from the second body end portion of the first body;

m) the pivot arm swingably engaged to the first body by a pivot pin, the pivot pin being adjacent to the first body end portion of the first body and spaced from the second body end portion of the first body;

n) wherein the gate includes an uppermost horizontally extending support member, an end upright support member, and an inner upright support member disposed inwardly of the end upright support member, the first body being fixed to the gate by a pin connector and engaging each of the uppermost support member, the end upright support member, and the inner upright support member of the gate;

o) the foot being visible to a user of the residential passageway barrier when the foot is in each of the first and second positions;

p) the pivot arm being visible to the user of the residential passageway barrier when the pivot arm is in each of the first and second positions;

q) the pivot arm including a first arm end portion and a second arm end portion, the first arm end portion of the pivot arm being adjacent to the first body end portion of the first body when the pivot arm is in each of the first and second positions of the pivot arm, the second arm end portion of the pivot arm being adjacent to the second body end portion of the first body in the first position of the pivot arm, the second arm end portion of the pivot arm being spaced from the second body end portion of the first body in the second position of the pivot arm;

r) the first arm end portion of the pivot arm including an uppermost section and a lowermost section, each of the uppermost section and the lowermost section of the first arm end portion of the pivot arm being outside of the first body when the pivot arm is in the first position, each of the uppermost section and the lowermost section of the first arm end portion of the pivot arm being outside of the first body when the pivot arm is in the second position;

s) the second arm end portion of the pivot arm including an uppermost section and a lowermost section, each of the uppermost section and the lowermost section of the second arm end portion of the pivot arm being outside of the first body when the pivot arm is in the first position, each of the uppermost section and the lowermost section of the second arm end portion of the pivot arm being outside of the first body when the pivot arm is in the second position;

t) a distance between the uppermost and lowermost sections of the first arm end portion of the pivot arm being a first distance, a distance between the uppermost and lowermost sections of the second arm end portion of the pivot arm being a second distance, and the first distance being greater than the second distance;

u) each of the uppermost and lowermost sections of the first arm end portion of the pivot arm being visible to the user when the residential passageway barrier is in use;

v) each of the uppermost and lowermost sections of the second arm end portion of the pivot arm being visible to the user when the residential passageway barrier is in use;

w) the first body including an exterior side surface;

x) the pivot arm covering a first portion of said exterior side surface and exposing to view a second portion of said exterior side surface of the first body when the pivot arm is in the first position;

y) the pivot arm covering a third portion of said exterior side surface and exposes to view a fourth portion of said exterior side surface of the first body when the pivot arm is in the second position;

z) the second portion of said exterior side surface of the first body being visible to the user when the residential passageway barrier is in use; and aa) the fourth portion of said exterior side surface of the first body being visible to the user when the residential passageway barrier is in use.

* * * * *